United States Patent
Weiss et al.

(10) Patent No.: US 6,789,842 B2
(45) Date of Patent: Sep. 14, 2004

(54) GUIDE MECHANISM FOR A COVER OF A SLIDING/TILTING ROOF

(75) Inventors: Edgard Weiss, Alzenau (DE); Hubert Bachmann, Dannstadt (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/649,168

(22) Filed: Aug. 27, 2003

(65) Prior Publication Data

US 2004/0041440 A1 Mar. 4, 2004

(30) Foreign Application Priority Data

Sep. 3, 2002  (DE) .......................................... 102 40 635

(51) Int. Cl.⁷ ................................................. B60J 7/05
(52) U.S. Cl. .................. 296/213; 296/216.08; 296/224
(58) Field of Search ........................... 296/213, 216.08, 296/221–224

(56) References Cited

U.S. PATENT DOCUMENTS

| 3,894,767 | A | * | 7/1975 | Schatzler et al. ........... 296/213 |
| 4,883,311 | A |   | 11/1989 | Kohlpaintner et al. |
| 4,936,622 | A |   | 6/1990 | Yamauchi et al. |
| 4,971,386 | A |   | 11/1990 | Bohm et al. |
| 4,982,995 | A |   | 1/1991 | Takahashi |
| 5,100,197 | A |   | 3/1992 | Ichinose et al. |
| 5,593,204 | A |   | 1/1997 | Wahl et al. |
| 5,718,472 | A | * | 2/1998 | Otake et al. ................. 296/221 |
| 6,290,289 | B1 | * | 9/2001 | Ohtsu et al. ................. 296/221 |

FOREIGN PATENT DOCUMENTS

| DE | 22 45 084 A | 3/1974 |
| DE | 4405742 | 5/1995 |
| DE | 19514585 | 10/1996 |
| EP | 0 403 734 A | 12/1990 |
| EP | 0 554 946 A | 8/1993 |

OTHER PUBLICATIONS

Search Report, European Patent Office, dated Dec. 10, 2003.
Search report, Austrian Patent Office, dated Oct. 31, 2002.

* cited by examiner

*Primary Examiner*—Dennis H. Peddder
(74) *Attorney, Agent, or Firm*—Carlson, Gaskey & Olds

(57) ABSTRACT

A guide mechanism for the cover of a sliding/tilting roof has on each of the two sides thereof a slotted guide that is pivotally mounted to raise the cover. Arranged in the area of the rear edge of the cover is a unit that includes a drain gutter and, at each lateral edge, a guide part. In the raised position of the cover, the unit having the slotted guide is fully decoupled from the unit having the drain gutter in the horizontal direction of displacement.

11 Claims, 5 Drawing Sheets

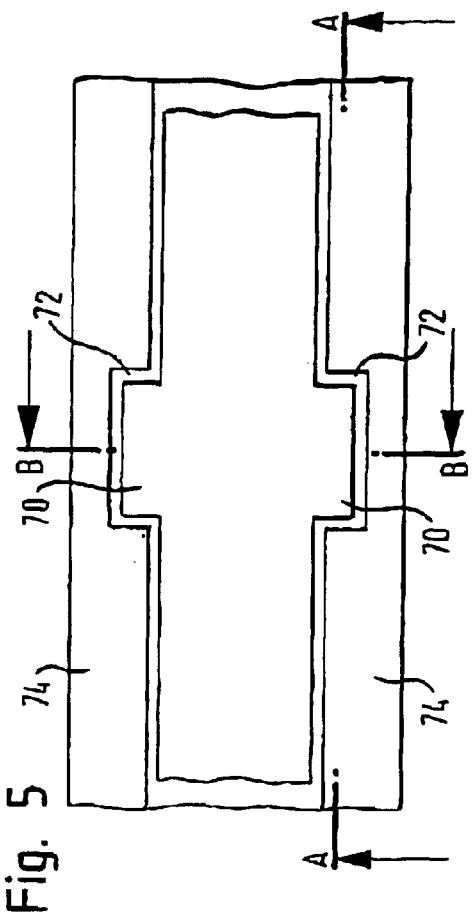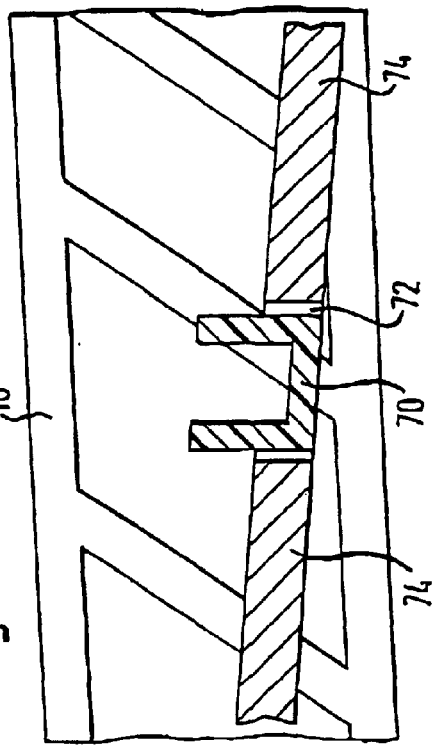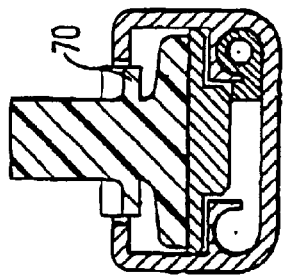

GUIDE MECHANISM FOR A COVER OF A SLIDING/TILTING ROOF

REFERENCE TO RELATED APPLICATIONS

The present invention claims the benefit of Federal Republic of Germany Patent Application No. 102 40 635.9, filed Sep. 3, 2002.

TECHNICAL FIELD

The present invention relates to a guide mechanism for a cover of a motor vehicle sliding/tilting roof, comprising at least one slotted guide that is at least indirectly coupled to the cover, and a drain gutter extending at the rear edge of the cover transversely to the vehicle and having an associated bearing part which is likewise shifted together with the drain gutter during horizontal shifting of the cover.

BACKGROUND OF THE INVENTION

A guide mechanism for a cover of a motor vehicle sliding/tilting roof may include at least one slotted guide that is at least indirectly coupled to the cover and a drain gutter extending at the rear edge of the cover transversely to the vehicle and having an associated bearing part which is likewise shifted together with the drain gutter during horizontal shifting of the cover. One example of a guide mechanism of this type is shown in DE 44 05 742 C1 or in DE 195 14 585 A1. Usually, profiled rails are arranged on either side of the cover, and there are at least one so-called front guide shoe and one so-called rear guide shoe running in each profiled rail. The terms "front" and "rear" refer to the condition as installed in the vehicle and to the longitudinal direction of the vehicle. The front guide shoe constitutes the pivot bearing of a lever-type slotted guide having at least one lateral guide track.

The slotted guide is indirectly or directly coupled to the cover. The guide track formed in the slotted guide is engaged by a sliding block connected with the rear guide shoe. The rear guide shoe is normally driven via a cable to resist buckling. When the rear guide shoe is displaced, the sliding block will travel in the guide track, providing for a swiveling motion of the slotted guide and hence for swiveling of the cover. The swiveling raises the cover, for instance, or, prior to displacement thereof, lowers it at its rear end.

Typically, a bearing part for the drain gutter positioned below the rear edge of the cover is a separate guide shoe which, in the prior art, is mechanically rigidly coupled to the slotted guide directly or indirectly by means of a linkage. A locking latch in the region of the bearing part allows the entire shiftable unit (e.g., the drain gutter and the bearing part) to be locked against any unintentional horizontal displacement in the raised position and in the intermediate positions down to the initial position, which is the closed position of the cover.

There is a desire for a guide mechanism having a simpler structure than currently-known guide mechanisms.

SUMMARY OF THE INVENTION

The object of the invention is to provide a simpler configuration in the guide mechanism for the cover of a sliding/tilting roof. This is achieved in a guide mechanism of the type mentioned above in that the slotted guide is fully decoupled from the drain gutter in the horizontal direction of displacement (longitudinal direction of the vehicle) when the cover is in a raised position. Unlike prior art structures, however, the guide mechanism according to the invention features no rigid coupling via a connecting lever or a connecting linkage in the direction of displacement so that the respective parts, which hitherto had been relatively long, may be dispensed with.

In one embodiment, the bearing part of the drain gutter preferably has a separate locking arrangement that is active in the raised position of the cover for securing the bearing part in position such as, for instance, a positive latching connection between a latching hook associated with the bearing part and a profiled rail provided for lengthwise shifting of the bearing part along with the drain gutter. "Positive latching" or "positive fit" means an engagement in a form-fitting manner.

The latching hook may be spring-mounted and, once it has reached an appropriate position, it will engage into a local recess in the profiled rail.

Advantageously, the bearing part is a plastic part adapted to be shifted within the profiled rail. The latching hook is preferably also a plastic part that is injection molded to a spring. The spring may be further provided with a shaped piece applied to it by, for example, injection molding and that may be positively inserted into an appropriate recess in the bearing part. This allows the invention to avoid using multi-component plastic parts since the properties needed for the latching hook differ from those required of the easily sliding bearing part.

In the initial and lowered positions of the cover, at least a portion of the unit including the slotted guide, and preferably the slotted guide itself, positively engages in the unit comprising the drain gutter and the bearing part in order to couple these two units with each other in the horizontal direction with a positive fit. Therefore, in the initial and the lowered positions, where the two individual units are in fact intended to be shifted as one joint unit, they are rigidly coupled to each other.

Preferably, in the area of the rear end thereof, the slotted guide has a downwardly pointing nose diving into a recess in the bearing part. This eliminates the need for any further intermediate parts, and the bearing part is of a very simple design since the nose may be injection molded integrally with the slotted guide.

In the raised position, the unit including the slotted guide has at least a portion that is directly locked in the profiled rail with a positive fit such that the cover is prevented from being displaced.

BRIEF DESCRIPTION OF THE DRAWINGS

Further features and advantages will be apparent from the following description and from the following drawings to which reference is made and in which

FIG. 5 shows a top view onto a portion of the slotted guide and of the profiled rail in the area of the front end of the slotted guide;

FIGS. 6a and 6b show sectional views taken along the lines A—A and B—B, respectively, in FIG. 5;

DETAILED DESCRIPTION OF THE DRAWINGS

Figure 1:
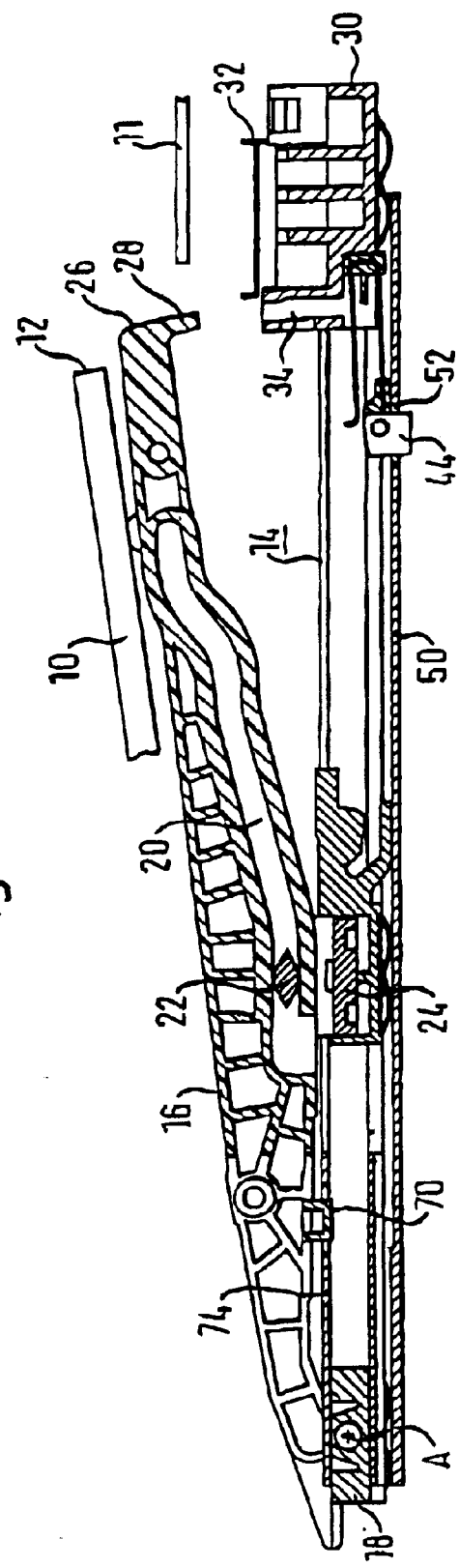
FIG. 1 shows a longitudinal sectional view through the guide mechanism in accordance with the invention in the raised position.

FIG. 1 illustrates a guide mechanism for a cover 10 of a sliding/tilting roof of a vehicle in a view taken from the side of the vehicle. The guide mechanism serves to bring the cover 10 into the different positions, namely, the raised position, the initial position (also referred to as closed position), and the lowered position, in which the cover 10, together with the entire guide mechanism, is moved to the rear to dive under the roof. Reference numeral 11 denotes a roof edge defining a roof opening. Reference numeral 12 denotes rear edge of the cover 10, which is shown schematically.

The guide mechanism is designed to be essentially identical on both sides of the cover 10; for this reason, the guide mechanism is illustrated in FIG. 1 on one side only. The guide mechanism comprises a C-shaped profiled rail 14 on either side of the roof cutout, which is rigidly secured at the edge of the roof cutout and is illustrated in the Figures without the typically integrated drain channel. A lever in the form of a slotted guide 16 made of a single-component plastic material is indirectly or directly coupled to the cover 10 and received for swiveling movement in a front guide shoe 18 at the opposite end. The swiveling axis of the slotted guide 16 is denoted by reference letter A.

The slotted guide 16 has a guide track 20 on each of its two side faces, with both guide tracks 20 being of identical design so that it is sufficient to illustrate only one of them. Running inside each guide track 20 is a sliding block in the form of a sliding guide block 22 adapted to be shifted by means of a rear guide shoe 24. The rear guide shoe 24 is adapted for horizontal shifting movement via a cable drive mechanism. The front and rear guide shoes 18, 24 are received for longitudinal sliding movement inside the profiled rail 14. A rear edge 26 of the slotted guide 16 has a downwardly pointing nose 28 integrally molded to it. Below the nose 28, a bearing part 30 is received in the profiled rail 14 for horizontal sliding movement. The bearing part 30 carries a drain gutter 32. The bearing part 30 and the drain gutter 32 constitute a separate, preassembled unit. Immediately below the nose 28, the bearing part 30 features a recess 34 adapted in shape to the nose 28.

Figure 8:
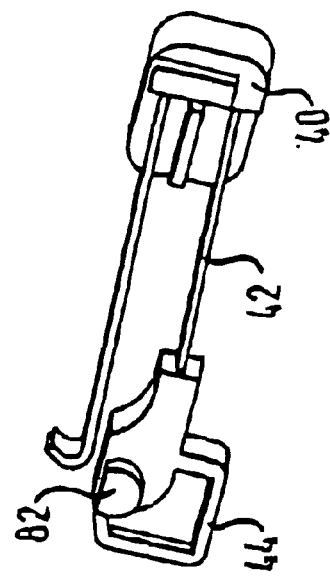
FIG. 8 shows the latching hook complete with a leaf spring and a shaped piece also injection molded to it.

Below the recess 34, the bearing part 30 has a lateral opening for receiving a shaped piece 40 that is connected with a latching hook 44 via a U-shaped leaf spring 42. The shaped piece 40, leaf spring 42 and latching hook 44 constitute a preassembled unit (FIG. 8) which is produced by injection molding the shaped piece 40 and the latching hook 44 onto the leaf spring 42.

Figure 7:
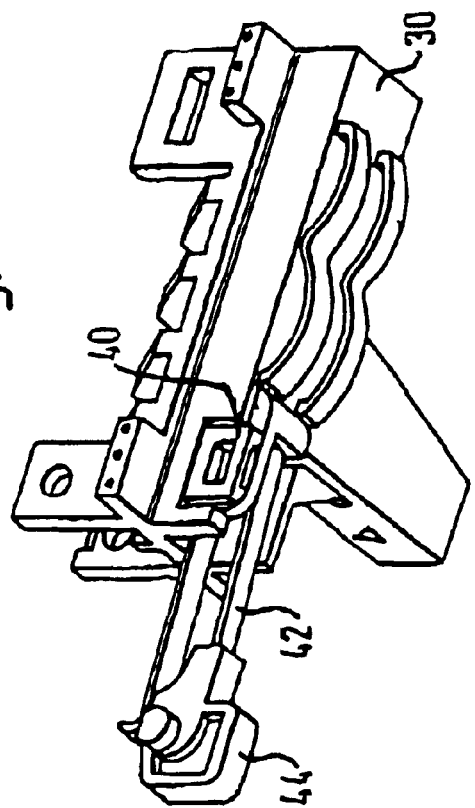
FIG. 7 shows a perspective view of the mounting of the drain gutter with the latching hook attached thereto.

As can be seen in FIGS. 1 and 7, in the fitted condition the latching hook 44 projects from the bearing part 30 forward.

In the raised position and in the initial position, predefined positions are required for the unit made up of the cover 10, the slotted guide 16 and the parts of the guide mechanism coupled to it and for the unit made up of the drain gutter 32 and the bearing parts 30 on either side thereof. Any horizontal displacement should be prevented.

Figure 2:
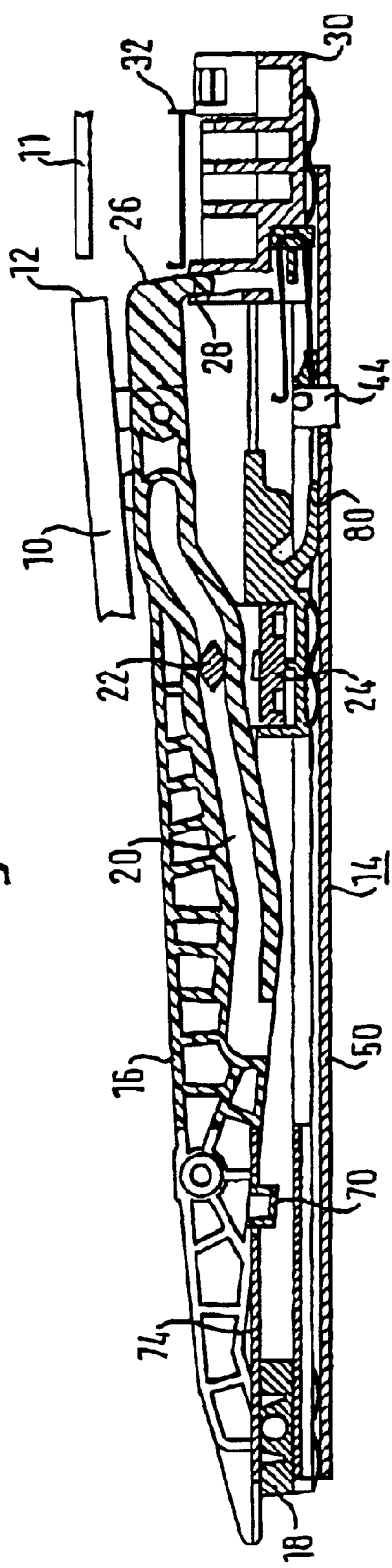
FIG. 2 shows a longitudinal sectional view through the guide mechanism in accordance with the invention in the initial position.
Figure 4:
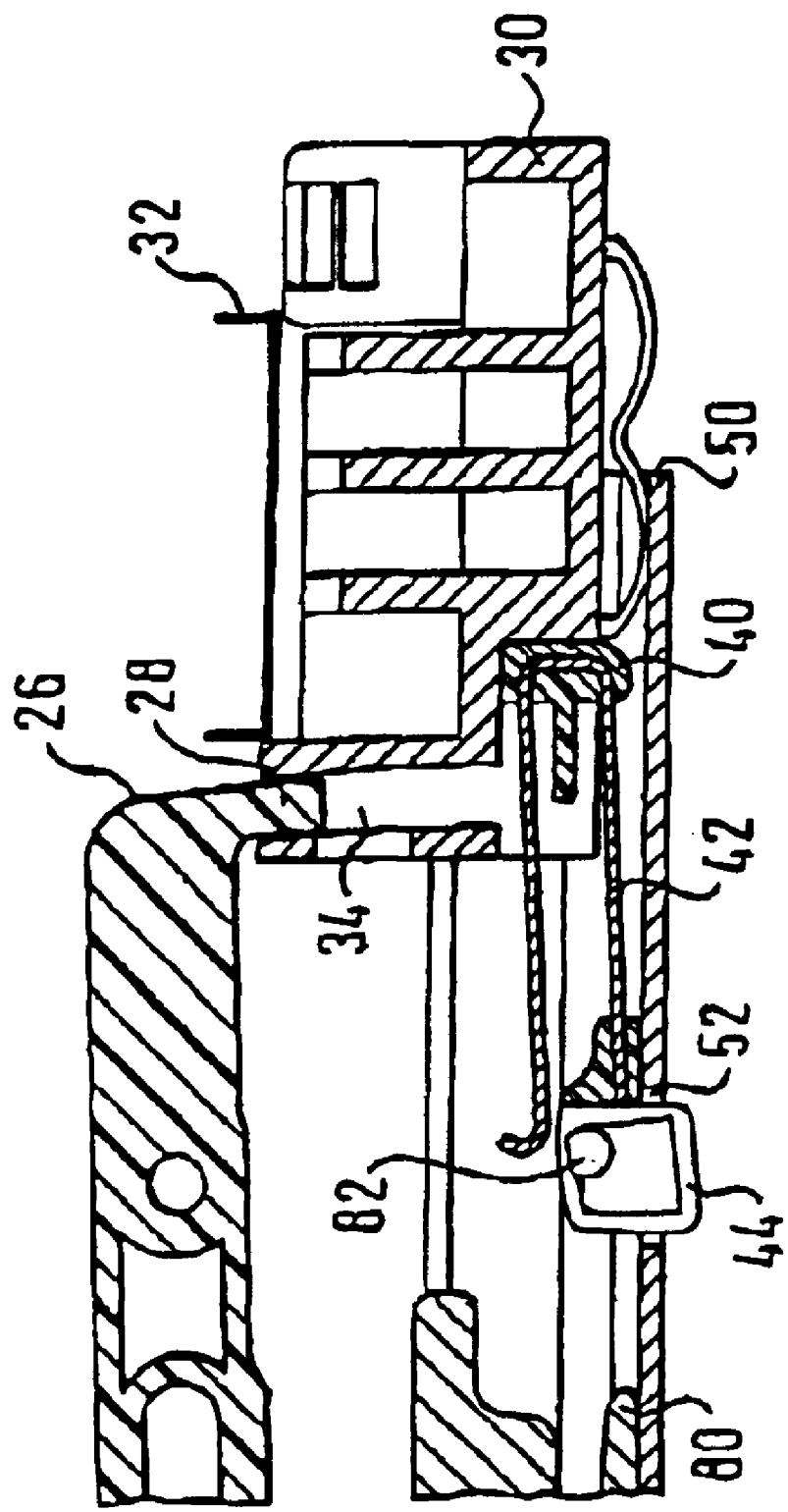
FIG. 4 shows a detail view on an enlarged scale of the rear end of the guide mechanism in the initial position.

In the raised position and in the initial position, the lower connecting web 50 of the profiled rail 14 has a local recess 52 for engagement by the latching hook 44 (see FIGS. 1 and 2). The latching hook 44 is urged downward by the force of the leaf spring 42. In this way, the latching hook 44 secures the drain gutter 32 in position horizontally (see also FIG. 4).

The other unit, comprising the cover 10 along with the slotted guide 16 and the front and rear guide shoes 18, 24, is fixed in position horizontally by means of a positive locking connection directly between the slotted guide 16 and the profiled rail 14. The slotted guide has laterally projecting extensions 70 integrally molded to its side faces (see FIGS. 1 through 3, 5 and 6a and 6b close to its swiveling axis A, which protrude into associated local recesses 72 in the upper webs 74 of the profiled rail 14. The positioning and the height of the extensions 70 allow them to protrude into the recesses 72 in both the raised and the initial positions (FIGS. 1 and 2). Further, the extensions 70 would strike against the webs 74 if an attempt were made to shift the slotted guide 16 and the cover 10 with it in a horizontal direction. On the other hand, the extensions 70 are positioned such that, in the lowered position, they will dive below the webs 74 and well then be located fully within the space circumscribed by the profiled rail 14 (see FIG. 3).

The mode of operation of the guide mechanism according to the invention will now be explained hereinbelow. In the initial position, the extensions 70 protrude into the recesses 72 (FIGS. 2, 6) so that the slotted guide 16 is prevented from any horizontal displacement along the profiled rail 14. The nose 28 projects into its associated recess 34 so that the unit defined by the slotted guide 16 is positively coupled to the unit defined by the drain gutter 32 in the direction of displacement. The latching hook 44 protrudes into the recess 52 (FIG. 4) so that an additional locking arrangement is provided in the initial position.

When the cover 10 is to be raised, the guide shoe 24 is shifted forward, preferably driven by a motor. The sliding guide block 22 sliding along in the guide track 20 acts to swivel the slotted guide 16 upward (FIG. 1). In the (silly raised position, with the nose 28 having cleared the recess 34, the unit comprising the slotted guide 16 and the cover 10 is completely decoupled mechanically from the unit including the drain gutter 32. In this position, the two units are locked against horizontal displacement by the associated extensions 70 and by the latching hook 44, respectively, i.e. by arrangements of their own for locking these two units in position.

Figure 3:
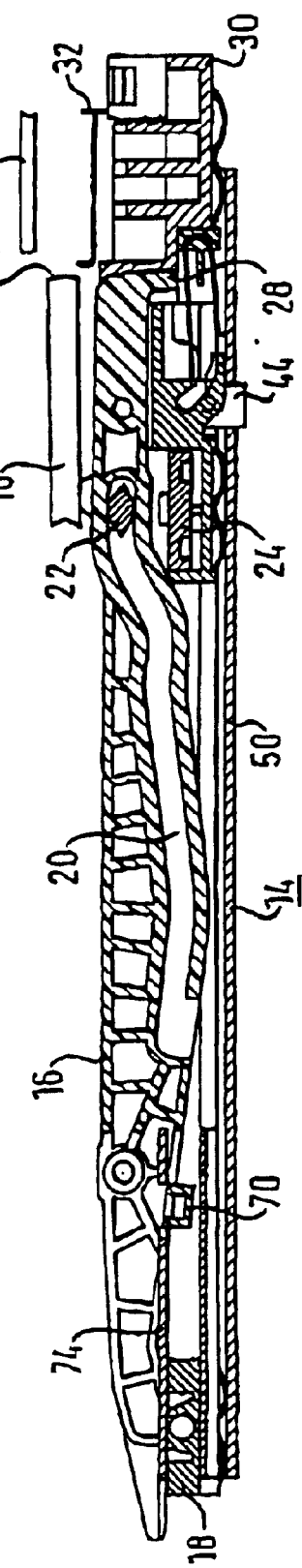
FIG. 3 shows a longitudinal sectional view through the guide mechanism in accordance with the invention in the lowered position.

When the cover 10 is to be shifted to the rear, the rear edge 12 thereof needs to dive below the level of the edge 11. The rear guide shoe 24 is therefore shifted to the rear (FIG. 3). In the lowered position the extensions 70 will dive below the webs 74, as already discussed hereinabove (FIG. 3). The rear guide shoe 24 is shifted further to the rear so that a wedge-shaped extension 80 thereon, which projects toward the latching hook 44 (see FIGS. 2 and 4), engages lateral tappets 82 provided On the latching hook 44 to move the latter upward into a disengaged position. The two units coupled with each other may now be shifted jointly horizontally.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A guide mechanism for a cover of a sliding/tilting roof, comprising:

a slotted guide unit having a slotted guide that is at least indirectly coupled to the cover and moves the cover to a raised position; and a drain gutter unit extending at the rear edge of the cover transversely to the vehicle and having a drain gutter and bearing part that is shifted together with the drain gutter during horizontal shifting of the cover, wherein the slotted guide disengages from the drain gutter unit in a horizontal direction of displacement when the cover is in a raised position.

and wherein the slotted guide unit has at least a portion that positively engages the drain gutter unit during an initial position and in a lowered position of the cover, wherein the engagement of the slotted guide unit and the drain gutter unit couples the slotted guide unit and the drain gutter unit together in a positive fit in the horizontal direction of displacement.

2. The guide mechanism as claimed in claim 1, wherein the bearing part of the drain gutter comprises a locking arrangement that is active in the raised position of the cover to secure the bearing part in position against the horizontal direction of displacement.

3. The guide mechanism as claimed in claim 2, wherein the locking arrangement comprises a latching hook associated with the bearing part and a portion of a profiled rail, wherein the bearing part of the drain gutter is adapted to be shifted along the profiled rail, and wherein a positive latching connection between the latching hook and the portion of the profiled rail secures the bearing part.

4. The guide mechanism as claimed in claim 3, wherein the portion of the profiled rail comprises a recess, and wherein the latching hook is spring-mounted and adapted to engage into the recess.

5. The guide mechanism as claimed in claim 3, wherein the beating part is a plastic part adapted to be shifted within the profiled rail and wherein the latching hook comprises a plastic material molded to a spring.

6. The guide mechanism as claimed in claim 1, wherein said portion of the slotted guide unit has a downwardly pointing nose on the-a rear end of slotted guide, wherein the nose engages with a recess in the bearing part.

7. The guide mechanism as claimed in claim 1, wherein in a raised position at least a portion of the slotted guide unit engages with a profiled rail with a positive fit such that the cover is prevented from being displaced in a horizontal direction.

8. A guide mechanism for a cover of a sliding/tilting roof, comprising:

a slotted guide unit having a slotted guide that is at least indirectly coupled to the cover and moves the cover to a raised position; and a drain gutter unit extending at the rear edge of the cover transversely to the vehicle and having a drain gutter and bearing part that is shifted together with the drain gutter during horizontal shifting of the cover, wherein the bearing part of the drain gutter comprises a separate locking arrangement that is active in the raised position of the cover to secure the bearing part in position against horizontal displacement.

wherein the locking arrangement comprises a spring-mounted latching hook associated with the bearing part and a recess in a lower connecting web of a profiled rail, wherein the bearing part of the drain gutter is adapted to be shifted along the profiled rail, and wherein a positive latching connection between the latching hook and the recess secures the bearing part, wherein the slotted guide disengages from the drain gutter in a horizontal direction of displacement when the cover is in a raised position, and wherein the slotted guide unit has at least a portion that positively engages the drain gutter unit during an initial position and in a lowered position of the cover, wherein the engagement of the slotted guide unit and the drain gutter unit couples the slotted guide unit and the drain gutter unit together in a positive fit in the horizontal direction of displacement.

9. The guide mechanism as claimed in claim 8, wherein the bearing part is a plastic part adapted to be shifted within the profiled rail and wherein the latching hook comprises a plastic material molded to a spring.

10. The guide mechanism as claimed in claim 8, wherein a rear end of the slotted guide has a downwardly pointing nose diving into a recess in the bearing part.

11. The guide mechanism as claimed an claim 8, wherein in a raised position at least a portion of a unit including the slotted guide engages with an upper connecting web of the profiled rail with a positive fit such that the cover is prevented from being displaced in a horizontal direction.

* * * * *

UNITED STATES PATENT AND TRADEMARK OFFICE
CERTIFICATE OF CORRECTION

PATENT NO. : 6,789,842 B2
DATED : September 14, 2004
INVENTOR(S) : Weiss et al.

It is certified that error appears in the above-identified patent and that said Letters Patent is hereby corrected as shown below:

Column 5,
Line 36, "beating" should read as -- bearing --.
Line 41, delete "the-".

Column 6,
Line 41, "an" should be -- in --.

Signed and Sealed this

Seventh Day of December, 2004

JON W. DUDAS
*Director of the United States Patent and Trademark Office*